United States Patent Office 2,836,885
Patented June 3, 1958

2,836,885

METHOD OF MAKING CERAMIC-TO-METAL SEALS

Kenneth Angus Macdonald, Glasgow, and Edward John Whitmore, Edinburgh, Scotland, assignors to Ferranti Limited, Lancashire, England, a company of Great Britain and Northern Ireland No Drawing. Application September 7, 1954
Serial No. 454,610

Claims priority, application Great Britain
September 9, 1953

6 Claims. (Cl. 29—472.9)

This invention relates to ceramic-to-metal seals.

An object of the invention is to provide an improved method of forming a ceramic-to-metal seal.

A further object is to provide a method of forming a ceramic-to-metal seal which is simpler and cheaper than methods hitherto used.

In accordance with the present invention, a seal is formed between a ceramic member and a metal member by applying to the appropriate surface of the ceramic member a film of finely-divided interstitial metallic carbide material suspended in a liquid, firing said film in an inert atmosphere at a temperature such as to cause the formation on said surface of a strongly-adherent layer of the carbide material, forming on the surface of said layer a metallized surface adapted to be wetted by a brazing material, and securing said metal member to said metallized surface by a brazing process.

The method as set forth in the preceding paragraph may be modified by firing the carbide film in an atmosphere containing hydrogen so that the strongly-adherent layer is partially or wholly converted to metal by said atmosphere.

The carbide material used in the method of the present invention may be tungsten carbide, or a mixture of metallic carbides such as tungsten carbide and titanium carbide.

Where the strongly-adherent layer is electrically conductive, the step of forming a metallized surface on said layer may include the steps of plating the surface of said strongly-adherent layer with a first metal adapted to bond to the material of said layer, plating the surface of said first metal with a second metal to assist brazing, and melting said second metal by firing in a suitable non-oxidizing atmosphere.

The step of forming a metallized surface may alternatively include the steps of applying to the surface of the strongly-adherent layer a film of like carbide material to that of the film applied to the surface of the ceramic member but mixed with a less amount of a finely-divided metal adapted to bond to the material of said layer and to be wetted by a brazing material, this mixture being suspended in a liquid, and firing the film thus applied to said layer in a non-oxidizing atmosphere.

Alternatively, the step of forming a metallized surface may include the steps of applying to the surface of the strongly-adherent layer a metal adapted to bond to the material of said layer, and sintering said metal by firing in a non-oxidizing atmosphere.

The metal adapted to bond to the material of the strongly-adherent layer may be nickel, cobalt or iron.

The ceramic member may be a highly refractory oxide such as alumina, zirconia, magnesia, thoria or silica, or a combination thereof; or a silicate-based ceramic such as that known by the registered trademark Frequentite.

The invention will now be described by way of example with reference to the formation of a seal between a metal member of 42% nickel-iron alloy and a ceramic member of Frequentite.

As the first step in the process, the appropriate surface of the ceramic member—that is, the surface to which the seal is to be made—is cleaned by washing in dilute nitric acid, washing in water, and firing in air at about 1200° C.

A film of a finely-divided tungsten carbide powder, suspended in an amyl acetate solution of nitrocellulose, is applied by painting on the cleaned surface of the ceramic and fired at 1250° C. in hydrogen for 15 minutes. A strongly-adherent layer of tungsten metal containing a small quantity of tungsten carbide is thereby formed on the ceramic surface.

The next step is to form on the surface of the adherent layer thus produced a metallized surface which can be wetted by one of the brazing metals or alloys. As the adherent layer is electrically conductive, this can be effected by electroplating with a metal that bonds to the material of the layer. Accordingly, the adherent layer is nickel-plated for 20 minutes at a current density of 0.07 amperes per square inch. To assist the brazing process the nickel surface is silver-plated for 20 minutes at the same current density and fired in hydrogen at 1050° C. to melt on the silver.

The nickel-iron metal member is prepared for the sealing step by being nickel-plated and silver-plated and fired at 1050° C. in hydrogen.

The nickel-iron member is then secured to the metallized surface of the ceramic member by brazing at 1050° C. in hydrogen, using silver as the brazing medium.

The above-described process results in a strong and vacuum-tight seal between the metal member and the ceramic member.

The process may be modified in various ways. For example, the carbide film may be fired in cracked ammonia rather than in hydrogen. The carbide film may also be fired in an inert atmosphere, in which case the carbide material is not decarbonized and the resulting adherent layer is of tungsten carbide rather than partly or wholly of tungsten metal. In any of the above-described process, the adherent layer may be plated with cobalt or iron instead of nickel.

With more refractory ceramics, such as alumina, it is preferable to use a mixture of metallic carbides rather than tungsten carbide alone. A mixture of 90% tungsten carbide and 10% titanium carbide powders in suspension and fired at 1650° C. in hydrogen or cracked ammonia is suitable.

The step of forming a metallized surface may alternatively be effected by applying to the surface of the adherent layer of tungsten and/or tungsten carbide a second film of like carbide material but mixed with a less amount of a finely-divided metal which bonds with the material of the layer and can be wetted by a brazing material. When a mixture of carbides is used for forming the adherent layer, the carbide material of the second film should be similar to that constituent of the mixture which is comparatively inert toward the ceramic.

Where the carbide film is of tungsten carbide, this second film may, for example, consist of 67% tungsten carbide powder and 33% cobalt metal powder suspended in an amyl acetate solution of nitrocellulose, painted on the surface of the adherent layer, and fired in cracked ammonia for 15 minutes at 1500° C. The presence of the cobalt allows the resulting surface to be wetted by any of the brazing metals or alloys. Before the metal member is brazed in place, this surface is coated with silver or copper—by electroplating or by painting on a suspension of powder—which is then melted by firing in cracked ammonia at 1050° or 1100° C., as the case may be.

Instead of cobalt powder, nickel or iron powder may be used.

A further method of forming a metallized surface is to apply to the surface of the adherent layer a suspension of nickel, cobalt or iron powder—each of which metals bonds to the tungsten and/or tungsten carbide of the layer—and sintering the suspension by firing in cracked ammonia at about 1100° C. for half an hour. The resulting surface is then coated with silver or copper, as in the case of the embodiment last described, prior to the actual brazing process.

In any of the above-described processes, other interstitial metallic carbides than tungsten carbide may be used.

The various temperatures above mentioned are not critical. The temperature of firing the carbide film must be high enough to enable the reaction to proceed but not high enough to alter the ceramic. In the process for metallizing the adherent layer by applying a film of like carbide material mixed with a metallic powder, the temperature of firing this film must be above the melting point of the cobalt or other metal but not high enough to cause its evaporation.

The process of the present invention not only is much simpler and cheaper than known processes for making ceramic-to-metal seals, but also has the additional advantage of allowing copper or silver brazing to be used; this results in a ductile bond which does not require such a close match between the thermal expansions of the ceramic and the metal as is required when a less ductile alloy is used.

What is claimed is:

1. A method of forming a seal between an alumina ceramic member and a metal member including the steps of applying to the appropriate surface of the ceramic member a film of finely-divided interstitial metallic carbide material consisting of a mixture of a major portion of tungsten carbide and a minor portion of titanium carbide suspended in a liquid, the titanium carbide comprising at least 10% of said mixture, firing said film in an atmosphere containing hydrogen at a temperature such as to cause the formation on said surface of a strongly-adherent layer of the carbide material at least partially converted to metal by said atmosphere, forming on the surface of said layer a metallized surface adapted to be wetted by a brazing material, the metal of said metallized surface being selected from the group consisting of nickel, cobalt and iron, and brazing said metal member to said metallized surface.

2. A method of forming a seal between an alumina ceramic member and a metal member including the steps of applying to the appropriate surface of the ceramic member a film of finely-divided interstitial electrically conductive metallic carbide material consisting of a mixture of a major portion of tungsten carbide and a minor portion of titanium carbide suspended in a liquid, the titanium carbide comprising at least 10% of said mixture, firing said film in an atmosphere containing hydrogen at a temperature such as to cause the formation on said surface of a strongly-adherent electrically conductive layer of the carbide material, plating the surface of said layer with a first metal, selected from the group consisting of nickel, cobalt and iron, adapted to bond to the material of said layer, plating the surface of said first metal with a second metal, selected from the group consisting of silver and copper, to assist brazing, melting said second metal by firing in a non-oxidizing atmosphere, and brazing said metal member to the plated surface of said ceramic member.

3. A method as claimed in claim 2 wherein said first metal is nickel, said second metal is silver and said last-mentioned atmosphere is a reducing atmoshpere.

4. A method as claimed in claim 1 wherein said step of forming a metallized surface includes the steps of applying to the surface of said strongly-adherent layer a second film comprising a mixture of like carbide material to that of said first-mentioned film and a less amount of a finely-divided metal, selected from the group consisting of nickel, cobalt and iron, adapted to bond to the material of said layer and to be wetted by a brazing material, said mixture being suspended in a liquid, and firing said second film in a non-oxidizing atmosphere.

5. A method as claimed in claim 4 wherein the relative proportions of said carbide material and said finely-divided metal are approximately two to one.

6. A method as claimed in claim 1 wherein said step of forming a metallized surface includes the steps of applying to the surface of said strongly-adherent layer a metal, selected from the group consisting of nickel, cobalt and iron, adapted to bond to the material of said layer, and sintering said metal in a non-oxidizing atmosphere.

References Cited in the file of this patent

UNITED STATES PATENTS

| | | |
|---|---|---|
| 2,454,270 | Braunsdorff | Nov. 23, 1948 |
| 2,686,958 | Eber | Aug. 24, 1954 |
| 2,722,496 | Hosmer | Nov. 1, 1955 |
| 2,780,561 | La Forge | Feb. 5, 1957 |
| 2,798,577 | La Forge | July 9, 1957 |